US012496509B2

(12) United States Patent
Da Silva Elias et al.

(10) Patent No.: US 12,496,509 B2
(45) Date of Patent: Dec. 16, 2025

(54) OBJECT BASED SCREENING OF SCRATCH-OFF PROTECTED DOCUMENTS

(71) Applicant: Brightstar Global Solutions Corporation, Providence, RI (US)

(72) Inventors: Hector Da Silva Elias, Pasco, FL (US); Crystal Dawn Fulton, Tampa, FL (US); Anthony Joseph Mazzullo, Jr., Seffner, FL (US)

(73) Assignee: Brightstar Global Solutions Corporation, Providence, RI (US)

( * ) Notice: Subject to any disclaimer, the term of this patent is extended or adjusted under 35 U.S.C. 154(b) by 157 days.

(21) Appl. No.: 18/441,478

(22) Filed: Feb. 14, 2024

(65) Prior Publication Data

US 2025/0256200 A1 Aug. 14, 2025

(51) Int. Cl.

| | |
|---|---|
| ***A63F 3/06*** | (2006.01) |
| ***B41J 2/21*** | (2006.01) |
| ***B41M 3/00*** | (2006.01) |
| ***B41M 3/14*** | (2006.01) |

(52) U.S. Cl.

CPC ........... *A63F 3/0655* (2013.01); *B41J 2/2121* (2013.01); *B41J 2/2132* (2013.01); *B41M 3/005* (2013.01); *B41M 3/008* (2013.01); *B41M 3/14* (2013.01); *A63F 2003/066* (2013.01); *A63F 3/0665* (2013.01)

(58) Field of Classification Search

CPC .......... B41J 2/2121; B41J 2/2132; B41J 2/01; B41M 3/005; B41M 3/008; B41M 3/14; B41M 3/066; A63F 3/0655; A63F 3/0665

See application file for complete search history.

(56) References Cited

U.S. PATENT DOCUMENTS

| | | | |
|---|---|---|---|
| 5,704,647 A | 1/1998 | Desbiens | |
| 6,344,902 B1 | 2/2002 | Duke et al. | |
| 7,720,421 B2 * | 5/2010 | Snyder | G03G 15/6573 347/100 |

(Continued)

FOREIGN PATENT DOCUMENTS

| | | |
|---|---|---|
| WO | 2019066889 A1 | 4/2019 |

OTHER PUBLICATIONS

"Curve Pilot 16—User Guide", Copyright 2016 Esko, downloaded from the Internet at: https://docs.esko.com/docs/en-us/curvepilot/16/userguide/home.html.

(Continued)

*Primary Examiner* — Kristal Feggins

(74) *Attorney, Agent, or Firm* — Neal, Gerber & Eisenberg LLP

(57) ABSTRACT

Documents (such as but not limited to lottery tickets), systems for manufacturing documents (such as but not limited to lottery tickets), and methods for manufacturing documents (such as but not limited to lottery tickets), wherein the document (such as an instant lottery ticket) that has a consistent overprint that covers both a SOC area and a display area of the document, and that thus provides a consistent application and appearance of the overprint despite the differences in the ink chemistry and texture of the SOC area and the display area surfaces of the document that underly the overprint. The overprint can include artwork including one or more images (such as but not limited to patterns).

20 Claims, 13 Drawing Sheets
(11 of 13 Drawing Sheet(s) Filed in Color)

(56) References Cited

U.S. PATENT DOCUMENTS

| | | | |
|---|---|---|---|
| 8,074,570 | B2 | 12/2011 | Grotkowski et al. |
| 9,774,763 | B2 | 9/2017 | Schulmeister et al. |
| 9,823,883 | B2 | 11/2017 | Yamagishi et al. |
| 10,742,848 | B2 | 8/2020 | Weil et al. |
| 11,623,133 | B2 | 4/2023 | Irwin et al. |
| 2005/0071104 | A1 | 3/2005 | Viturro et al. |
| 2005/0134872 | A1 | 6/2005 | Maki |
| 2005/0286742 | A1 | 12/2005 | Rasmussen et al. |
| 2010/0201998 | A1 | 8/2010 | Quach |
| 2018/0020126 | A1* | 1/2018 | Weil ...................... A63F 3/0655 |
| 2020/0218950 | A1 | 7/2020 | Hall |

OTHER PUBLICATIONS

"Prepressure: What is Dot Gain?", available before the priority date of this patent application; downloaded from the Internet at: https://www.prepressure.com/design/basics/dot-gain.

* cited by examiner

OBJECT BASED SCREENING OF SCRATCH-OFF PROTECTED DOCUMENTS

BACKGROUND

The present disclosure generally relates to documents, such as instant lottery tickets, having variable indicia under a scratch-off coating ("SOC"), and systems and methods for producing SOC protected documents. Particularly, this disclosure teaches using object based screening ("OBS") to provide consistent and attractive plate printing of SOC protected documents such as instant lottery tickets.

Instant lottery ticket games have become a time-honored method of raising revenue for state and federal governments the world over. The concept of hiding indicia (e.g., play symbols) under a SOC has also been applied to numerous other documents such as commercial contests, telephone card account numbers, gift cards, etc. Literally, billions of scratch-off products are printed every year where the SOCs are used to ensure that the product has not been previously used, played, or modified. SOC protected instant lottery tickets are used as the primary example of such documents herein.

The variable indicia can be printed using a specialized high-speed inkjet, providing a human-readable indication of the value of each instant lottery ticket. A SOC typically covers the variable indicia. While the term "SOC" can be interpreted to imply a single printed ink film covering the variable indicia, a typical SOC is actually comprised of multiple layers of ink films with each layer performing a specific purpose.

Typically, the variable indicia are printed using specialized high-speed inkjets imaging water-based ink on top of static plate printed (e.g., gravure, flexographic) ink film security layers that provide opacity, physical barriers, chemical barriers, and a higher contrast background for the inkjet variable indicia. The purpose is to ensure that the printed variable indicia cannot be read or decoded without first removing the associated SOC, thereby ensuring that a game or other document is secure against picking out winners or extracting confidential information from unsold tickets or other documents.

This mitigation of security threats (i.e., reading or decoding the variable indicia without noticeably removing or altering the SOC) with elaborate ink film countermeasures has evolved to increasingly complex instant ticket SOC ink film designs. Thus, the SOC ink films have become exceedingly chemically complex countermeasures developed over decades.

As such, it has become difficult to print consistently appearing colorful images (such as but not limited to patterns) over both the SOC and display areas (areas of a ticket not covered by SOC) using common color printing plates or imagers. This difficulty is due to the radically different chemistries and textures of the SOC when compared to the display areas on the substrate, with the surfaces' differences causing colors printed on the SOC to appear and cover different than colors printed on the display area.

One known method of mitigating the SOC and display surfaces colors appear different is to use two sets of printing plates or imagers (i.e., one set for printing the SOC and one set for printing the display). With this known method, each set of printing plates can be configured to print on its respective surface, thereby enabling fine-tuning of the printing parameters (e.g., dot size, screen angle) for each surface to create consistently appearing colorful images on both the SOC and display areas. However, this known method has the disadvantage of increased costs, a more complex printing press, and a general overall increase in complexity, thereby making it an undesirable solution for most practical purposes.

BRIEF SUMMARY

In various embodiments, the present disclosure relates to a system and method for printing an instant lottery ticket having a substrate. The system is configured to and the method includes: (1) determining a first portion of artwork to print on a display area of the substrate, wherein the first portion comprises a first volume of ink; (2) determining a second portion of the artwork to print on a Scratch-Off Coating (SOC) area of the substrate, wherein the SOC area has a different composition than the display area, wherein the second portion comprises a different second volume of ink, wherein the different first and second volumes of ink are determined by creating and assigning different Dot Gain Compensation (DGC) curves for the display area and the SOC area; (3) printing the first portion of artwork on the display area of the substrate; and (4) printing the second portion of the artwork on the SOC on the SOC area of the substrate.

In various other embodiments, the present disclosure relates to a system and method for generating an overprint raster file based on an artwork file. The system is configured to and the method includes: (1) determining a display Dot Gain Compensation (DGC) curve set for a first portion display area of a substrate fingerprint; (2) determining a SOC DGC curve set for a second portion Scratch-Off Coating (SOC) area fingerprint; (3) applying the display DGC curve set to a first portion display area file, thereby modifying dot size in the display area file to create a modified display area file; (4) applying the SOC DGC curve set to a second portion SOC area file, thereby modifying dot size in the SOC area file to create a modified SOC area file; (5) merging the modified display area file and the modified SOC area file into a single combined file; (6) causing a Raster Image Processor (RIP) to convert the single combined file into the overprint raster file that is usable to ensure a consistent appearing overprint on both the display area and the SOC area of an instant lottery ticket, wherein the display area and the SOC area have different compositions, and wherein the overprint is based on artwork of the artwork file; and (7) storing the raster file for on-press production.

In various other embodiments, the present disclosure relates to a method for printing consistently appearing images of artwork over both a display area and a Scratch-Off Coating (SOC) of an SOC area of an instant lottery ticket using an on-press imager. The system is configured to and the method includes: (1) using fingerprinting to determine a display area Dot Gain Compensation (DGC) curve set; (2) using fingerprinting to determine a SOC DGC curve set; (3) separating a vector portion and a raster portion of the artwork; (4) storing the vector portion in a vector portion file; (5) storing the raster portion in raster portion file; (6) separating a display area portion and a SOC area portion of the vector portion in the vector portion file; (7) storing the display area portion in a display area vector portion file; (8) storing the SOC area portion in a SOC area vector portion file; (9) separating a display area portion and a SOC area portion of the rater portion in the raster portion file; (10) storing the display area portion in a display area raster portion file; (11) storing the SOC area portion in a SOC area raster portion file; (12) applying the display area DGC curve set to the display area raster portion file to create a modified display area raster portion file; (13) applying the SOC DGC curve set to the SOC area raster portion file to create a modified SOC raster portion file; (14) merging the modified display area raster portion file and the modified SOC area raster portion file into a modified raster portion file; (15) converting the modified raster portion file into raster files with a Raster Image Processor (RIP); (16) converting the raster files into formatted raster files configured to be processed by the on-press imager; (17) embedding the formatted raster files; and (18) storing the formatted raster files for on-press imager production to ensure consistent printing of the images of the artwork over both the display area and the Scratch-Off Coating (SOC) of the SOC area of the instant lottery ticket.

Additional features are described herein and will be apparent from the following Detailed Description and the figures.

BRIEF DESCRIPTION OF THE SEVERAL VIEWS OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1A:
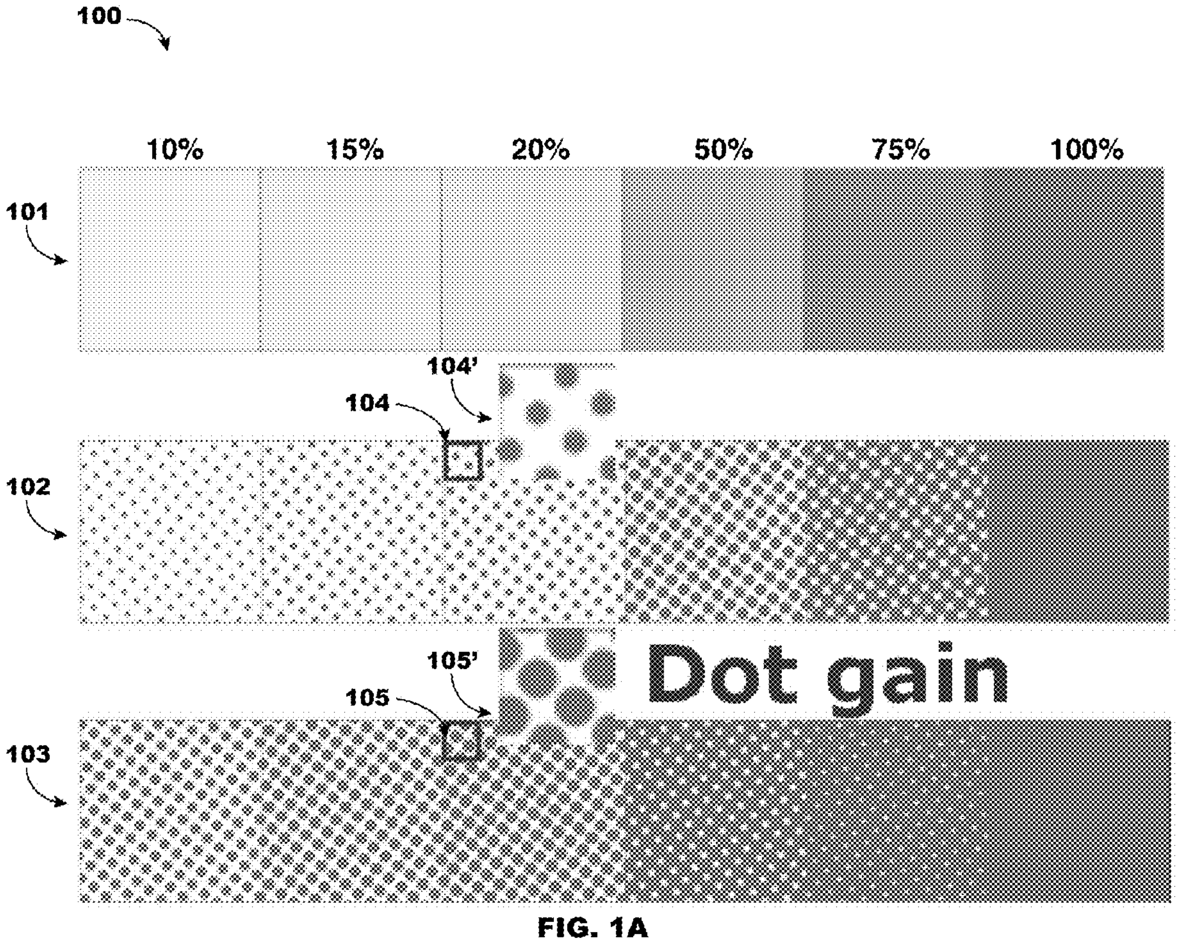
FIG. 1A PRIOR ART
FIG. 1A is a front view of a representative example of a known printed dot gain with Amplitude Modulation (AM) printed dots over a range of grayscale shades.

Certain terminology is used herein for convenience only and is not to be taken as a limitation on the present disclosure.

The words “a” and “an” are meant to include “at least one.”

The word “document” is meant to include but not be limited to an “instant lottery ticket,” a “commercial contest scratch ticket,” a “telephone card account number card,” a “scratch-off gift card,” or a “scratch-off card.”

The words “image” or “print” are used to refer to whatever indicium or indicia is or are created directly or indirectly on any substrate or surface that may be done by any known or new imaging or printing method or equipment. Likewise, “imaging” or “printing” describes a method and “imaged” or “printed” describing the resulting indicium or indicia are used to refer to correspondingly to “image” or “print.”

The words “multi” or “multiple” are used to refer to at least two and can also include three, four, or more, for example, unless otherwise indicated in the context of the use of the terms.

The word “variable” indicium or indicia refers to imaged indicia that indicates information relating to a property, such as, without limitation, the value of the document such as an instant lottery ticket where the variable indicium or indicia can be hidden by a SOC or other obfuscation medium until the information or value is authorized to be seen, such as by a purchaser of the instant lottery ticket who scratches off the SOC or other obfuscation medium, revealing the variable indicium or indicia. Examples of variable indicium or indicia as a printed embodiment include letters, numbers, icons, or figures.

The words “full-color” and “process color” are used to refer to a variety of colors by discrete combinations of applications of primary inks or dyes “CMY” (i.e., Cyan, Magenta, and Yellow), or the more common four color “CMYK” (i.e., Cyan, Magenta, Yellow, and black), or in some cases six colors (e.g., Hexachrome printing process uses CMYK inks plus Orange and Green inks), or alternatively eight colors—e.g., CMYK plus lighter shades of cyan (LC), magenta (LM), yellow (LY), and black (YK).

The words “component color” is used to refer to a single individual color that is used with at least one other component color to create a combined process color.

The word “ink” is used to refer to either or both “pigmented inks” and “colored dyes.”

The words “spot color” is used to refer to a color that is intended to be printed and displayed by itself and not intended to be utilized as a composite color or process color.

The word “grayscale” is used to refer to an analytic metric expressed in percentages to determine printing dot size or line screen. With the grayscale metric, a value of 0% denotes white paper (i.e., no ink coverage) and a value of 100% denotes total ink coverage (saturation).

The words "dot gain" refer to a phenomenon that causes printed material to appear other than intended. In the context of the present disclosure, dot gain can either be positive (i.e., more ink applied) or negative (i.e., less ink applied) to printed material than intended, resulting in an undesirable appearance.

Positive dot gain can occur because size of the printed dots (such as measured by the diameter) increases during the prepress and printing process. The optical and physical properties of the media and machines used in preparing artwork for printing and the printing process can cause this positive dot gain behavior.

Negative dot gain can occur because the substrate that the printed ink is applied to absorbs a significant portion of the applied ink, resulting in less ink appearing on the surface of the substrate.

Dot gain is expressed sometimes herein as a numerical value that equals the difference between the intended and resulting values. For example, if a printed page has an intended 50% tint for its background, but after printing, the tint is actually 65%, the positive dot gain in this example would equal 15%. Conversely, if a printed page has an intended 50% tint for its background, but after printing, it is 35%, the negative dot gain in this example would equal −15%.

FIG. 1A provides a graphic example 100 of dot gain with Amplitude Modulated (AM) printed dots where all of the dots are intended to be printed with varying diameters depending on the desired grayscale level. In this example, row 101 illustrates various flat tints of cyan as they would be intended to be viewed on a printed product. Row 102 of FIG. 1A illustrates the same flat tints of row 101 magnified so that the intended dot sizes are visible with a further magnified area 104 illustrating the intended dots in even greater detail in area 104'. In contrast, row 103 provides a magnified illustration of the same flat tints of row 101 as they would appear on the printed page with a further magnified area 105 illustrating the printed dots in even greater detail in area 105'. Thus, the dot gain is the size of the printed dots in the same respective areas 104 and 105.

Figure 1B:
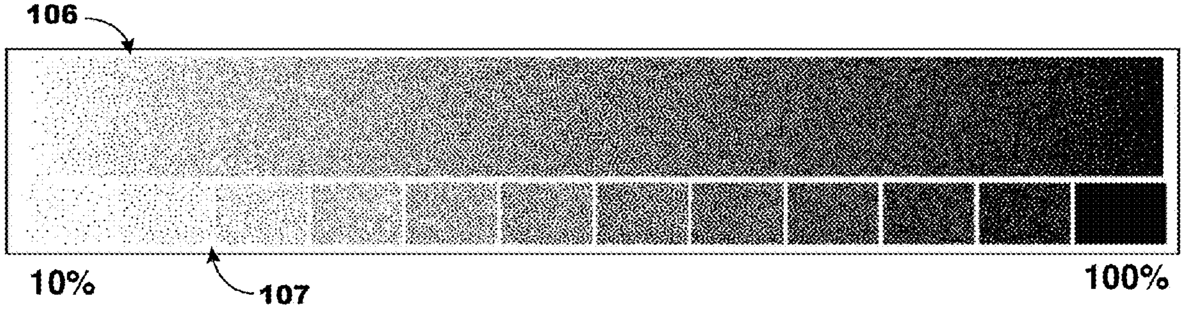
FIG. 1B PRIOR ART
FIG. 1B is a front elevation view of a representative example of known Frequency Modulation (FM) or stochastic screening printed dots over a range of grayscale shades.

FIG. 1B a second graphic example illustrating dots printed Frequency Modulated (FM) or stochastic imaging where all of the dots are intended to be printed with the same diameter with the quantity of dots printed in a given area varying depending on the desired grayscale level. FIG. 1B is conceptually divided into two rows: (1) The top row 106 illustrates a bar gradually changing from a grayscale of 10% on the left-hand side to a completely saturated grayscale of 100% on the right-hand side. The bottom row 107 illustrates discrete magnified portions of the top row 106 changing from a grayscale of 10% on the left-hand side to a completely saturated grayscale of 100% on the right-hand side. This pseudorandom appearing distribution of printed dots at a microscopic level inherent with the FM stochastic method of printing produces a higher quality image.

Before describing the present disclosure, it is also useful to provide an example of dot gain compensation ("DGC") curves as well as an example structure of an instant lottery ticket. The exemplary description of DGC curves is provided in the discussion of FIG. 1C, and the description of a known structure of an instant lottery ticket is provided in the discussion of FIG. 1D.

Figure 1C:
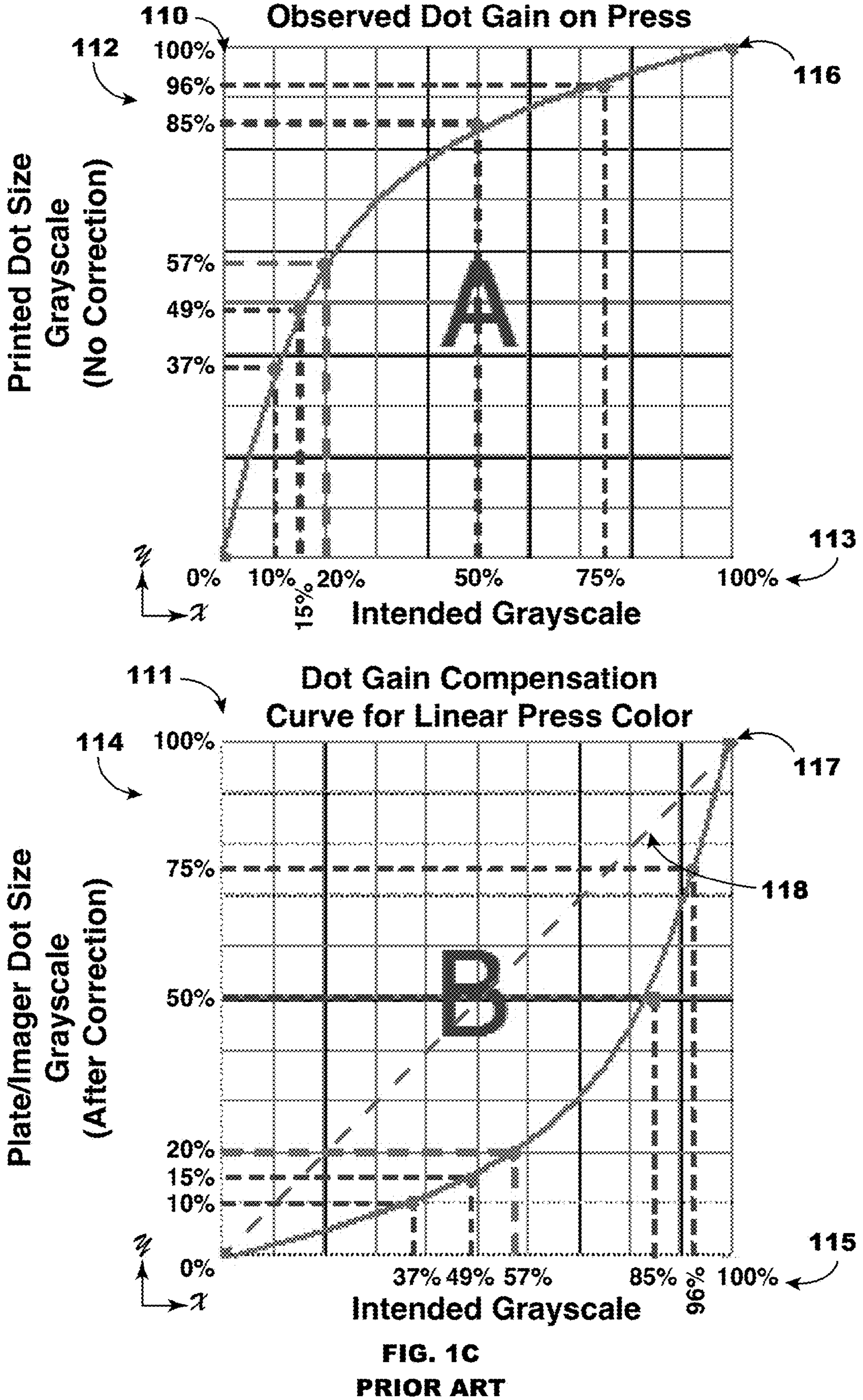
FIG. 1C PRIOR ART
FIG. 1C is a front view of a representative example of known dot gain curves, both the actual printed dot gain 110 curve and a Dot Gain Compensation (DGC) curve 111 to achieve linearity 118 when printed.

FIG. 1C illustrates two different dot gain curves 116 and 117 plotted on separate grids 110 and 111, respectively. The dot gain curve 116 indicates an actual dot gain for a given printed sample, and the dot gain curve 117 indicates the associated DGC curve that would effectively negate the actual positive dot gain, producing an actual linear printed dot gain 118 (i.e., a printed result as intended).

Both dot gain curves 116 and 117 show printed dot size in grayscale on the Y-axis or ordinates 112 and 114, and intended dot size in grayscale on the X-axis or abscissas 113 and 115 of the two grids 110 and 111, respectively. As shown, dot gain curve 116 is nonlinear, with the greatest dot gains observed below 50% of the intended grayscale, with curve 116 flattening out after 50% of the intended grayscale. Dot gain curve 117 is the "mirror image" of dot gain curve 116, which theoretically eliminates all dot gain in the printed material when applied to dot gain curve 116.

Figure 1D:
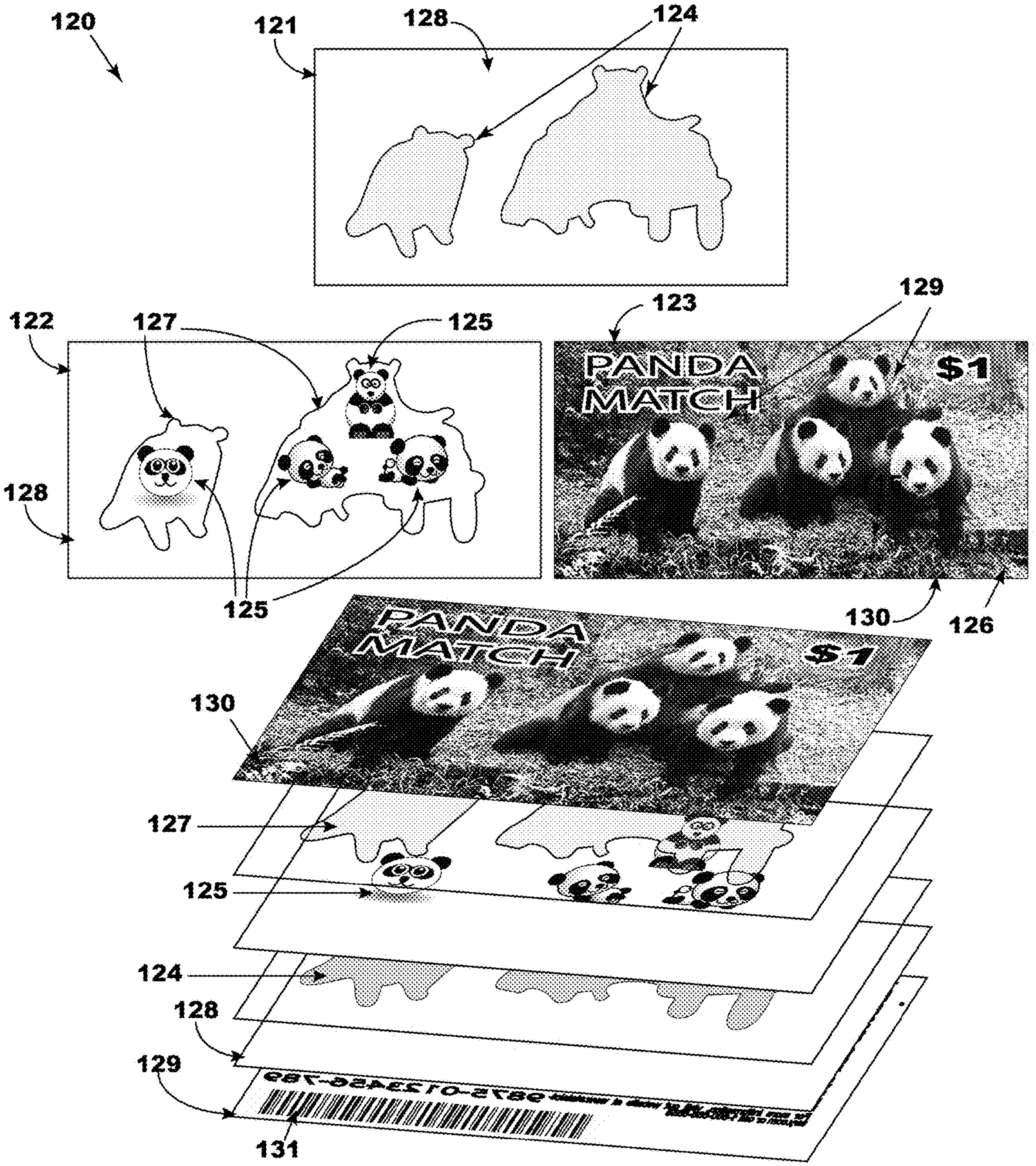
FIG. 1D PRIOR ART
FIG. 1D is a combination plan and isometric view of a representative example of a known scratch-off instant lottery ticket with a common overprint that covers both the display 128 and the SOC 124 portions.

As shown in FIG. 1D, an example known instant lottery ticket construction entails overprinting of both the display area 126 and the SOC area 129 of the instant lottery ticket 130 with a single set of printing plates or application of a digital imager, hopefully producing a consistent appearance of colors and application across the entire front surface of the instant lottery ticket. However, the differences in the chemistry and texture of the surfaces of the display area 126 and the SOC area 129 create vexing challenges to achieve any resemblance of a consistent homogeneous printed appearance on the front of the instant lottery ticket 130. Historically, any differences in appearance between the display area and the SOC area have been viewed as a necessary compromise or too subtle for the ultimate instant lottery ticket consumer to care about. In some cases, the instant lottery ticket's surface was printed with two sets of process color printing plates (i.e., one set for the display and one set for the SOC), thereby enabling fine-tuning of the front-of-the-ticket appearance. However, this process is much more complex and expensive due to the need for duplicate sets of printing plates and has also been shown to be problematic in the past.

More specifically, FIG. 1D depicts an exemplary combination plan and isometric view of a representative example of a scratch-off instant lottery ticket 120 having a substrate front 128 and substrate back 129. As shown in image 121, the front 128 of the substrate is printed with lower security layers 124 that provide protection against candling, diffusion, and other potential security threats. As shown in image 122, variable indicia 125 are imaged over the predefined lower security layers 124 with a release coat and SOC 127 plate printed on top of the variable indicia 125. As shown in image 123, the front display portion 126 (i.e., the area of the front of the ticket 120 not covered with a SOC) and the SOC portion 129 are overprinted using process colors to create colorful images (such as but not limited to patterns) over both the SOC and display areas using process color printing plates or imagers. As shown in FIG. 1D, the substrate back 129 is printed using static plate printing and contains legal information, an identity block, and variable indicia 131, which are both human and machine-readable inventory control information. Thus, this example instant lottery ticket includes a composite of various layers of ink films, both digitally imaged and printed with static plates on both sides of the substrate.

Reference will now be made in detail to example embodiments of the present disclosure, wherein one or more of the example embodiments are illustrated in the figures. Each example embodiment is provided by way of an explanation of the present disclosure and not as a limitation of the present disclosure. For instance, features illustrated or described with respect to one embodiment can be used with another embodiment to yield still a further embodiment. It is intended that the present application encompasses these and other modifications and variations as come within the scope and spirit of the present disclosure. As mentioned above, lottery tickets are used herein as an example of the documents of the present disclosure for brevity and are not meant to limit the present disclosure.

Various embodiments of the present disclosure relate to documents (such as but not limited to lottery tickets), systems for manufacturing documents (such as but not limited to lottery tickets), and methods for manufacturing documents (such as but not limited to lottery tickets). The acts performed as part of the methods can be ordered in the manners described herein or in any other suitable way. Accordingly, embodiments can be constructed in which acts are performed in an order different than as illustrated and/or described herein, which can include performing some acts simultaneously, even though such acts are shown as being sequentially performed in illustrative example embodiments.

In various embodiments, the present disclosure relates to a system and method for creating a document (such as an instant lottery ticket) that has a consistent overprint that covers both the SOC area and the display area of the document, and that thus provides a consistent application and appearance of colors of the overprint despite the differences in the ink chemistry and texture of the SOC area and the display area surfaces of the document that underly the overprint. The overprint comprises one or more images, such as but not limited to patterns. The overprint is consistent in color(s), shades, hues, sharpness, and smoothness across both the display and SOC areas.

In various embodiments, the system and method can apply this consistent overprint as process colors (e.g., Cyan, Magenta, Yellow, black—a.k.a. "CMYK"), spot colors, or monochromatic grayscale by either printing plates or inkjet imagers. In various embodiments, the overprint's consistent color appearance is achieved by printing differing respective proportional volumes of ink on the display area and on the SOC area, wherein the differing respective proportional volumes of ink are determined by creating and assigning different DGC curves for the display area and the SOC area (and while still using static printing plates or inklet imagers). In other words, this consistent overprint can be applied as process colors (e.g., CMYK), spot colors, or monochromatic grayscale by either printing plates or inkjet imagers in accordance with the present disclosure.

In various embodiments, the system and method enable printing of a consistently appearing overprint on the entire face (such as a front face) of a document (such as but not limited to an instant lottery ticket) using just one set of process color printing plates or one process color imager. This consistent color and application appearance of the overprint is achieved by using OBS, providing differing proportional volumes of ink on the display area and the SOC area of the document (such as the instant lottery ticket) by creating and assigning separate DGC curves for the display and SOC areas while still using only one set of printing plates or an inkjet imager.

In various embodiments, the system and method determine different DGC curves for the different portions of the overprint that are on the display area and the SOC area of a document at least partially based on separate press fingerprinting data of the display area and the SOC area. By generating separate and discrete fingerprints for the display area and the SOC area of the same document, the system and method can utilize the resulting fingerprint data to generate separate DGC curves that are then ultimately merged into the same printing plates or imager files for determining the overprints on those areas, with each curve only affecting the dot gain of its respective area (i.e., the display area or the SOC area) of the document.

In various embodiments, the system and method determine the respective DGC curves for the different portions of the overprint that are on for the display area and the SOC area that are each nonlinear, with differing grayscale values receiving different adjustment biases applied to their respective dot gains. These nonlinear curve biases can differ in interpolation and/or smoothing in accordance with the present disclosure.

In various embodiments, the system and method, by first printing separate "fingerprint" samples of the display area and the SOC area, each fingerprint sample can be scanned and digitally analyzed to create respective unique DGC curves for the different portions of the overprint that are on display area and the SOC area. Fingerprinting is a process to determine how a press physically prints, thereby quantifying its printed dot gain values. Press fingerprinting is inherently dependent on press operating parameters and consequently should be repeated if there is a change to these parameters, including substrate type, ink, plate, run speed, and/or screening (e.g., dot shapes, ruling, screen angles, etc.). In general, the present disclosure thus employs a set of DGC curves for each set of operating parameters commonly employed with a given press.

In various embodiments, the system and method create the fingerprint samples by generating printing plates or imager files that contain various patches with different grayscale values (e.g., 1%, 5% . . . 95%, 100%) for each color that will be printed. Thus, to properly fingerprint both the display area and the SOC area of a document (such as an instant lottery ticket) for CMYK process colors, a total of eight different sets of grayscale value patches are generated and printed (i.e., four for each color for both the display and SOC areas). In various embodiments, the system and method also employ different sets of fingerprints for each nominal press speed.

In various embodiments, the system and method, after the display and SOC fingerprint sets have been printed, flatbed scan and digitally analyze the various print samples to create sets of DGC curves for different portions of the overprint that will be on the display area and the SOC area of the document (such as the instant lottery ticket). While the system and method can automate these step using various off-the-shelf software products (such as but not limited to Esko's Curve Pilot 22), the desired DGC curve sets can also be created manually by measuring printed dot gain at each grayscale value and plotting the dot gains on an X/Y grid as shown in 110 of FIG. 1C in accordance with the present disclosure.

In various embodiments, the system and method, after the actual printed dot gain curve is determined, interpolates the associated DGC curve 111, as shown FIG. 1C. However, it should be noted that full dot gain compensation (i.e., linearization) can, in certain instances, produce a printed document that has one or more areas that are too light in appearance. Thus, to obtain a visually pleasing print result, in various embodiments, the system and method retain a certain amount of dot gain in the final printed product (e.g., a grayscale of 50% prints as 65.5% with dot gain). As a practical matter. In various embodiments, the system and method first create automated DGC curves with some manual editing applied to the automated DGC curves to fine-tune the DGC curve to achieve optimum results with dot gain greater than linearity.

In various embodiments, after the two sets of DGC curves have been generated for the different portions of the overprint that are on the display and SOC areas of an instant lottery ticket, the system and method divide the overall front of the document artwork (such as the instant lottery ticket artwork) into two separate portions and particularly, the display area portion (a first portion) and the SOC area portion (a second portion). In various embodiments, the system and method apply the appropriate sets of DGC curves to each respective separate portion of the overprint, thereby creating different dot compensations for the different first and second portions of the overprint that will be printed or imaged on the respective display area and SOC area of the document (such as the instant lottery ticket).

It should be appreciated that for a document such as an instant lottery ticket, the quantity of the display areas can be one or more, the quantity of the SOC areas can be one or more, and correspondingly the quantity of the display area portions of the artwork can be one or more and the SOC area portions of the artwork can be one or more. In other words, the artwork of the overprint can be divided into more than two portions, such as one or more portions for the display area and one or more portions for the SOC area. For simplicity, the present disclosure discusses one display area and one SOC area of the document, but it should be appreciated that such embodiments are not meant to limit the present disclosure.

Once each set of DGC curves has been applied to its associated portion, the system and method merge the two separate portions into one or more common digital file(s) comprising the entire front of the document (such as the instant lottery ticket) that forms the overprint. The system and method further cause this/these merged file/files is/are to be further processed by a raster image processor ("RIP"), with the resulting RIP output converted to printing plates or imager files. The system and method can then use the generated printing plates or imager files to create the document (such as the instant lottery ticket including the overprint comprising the artwork over the display area(s) and SOC area(s) of the lottery ticket). The system and method can also store the generated printing plates or imager files for subsequent document creation (such as the instant lottery ticket).

Figure 2A:
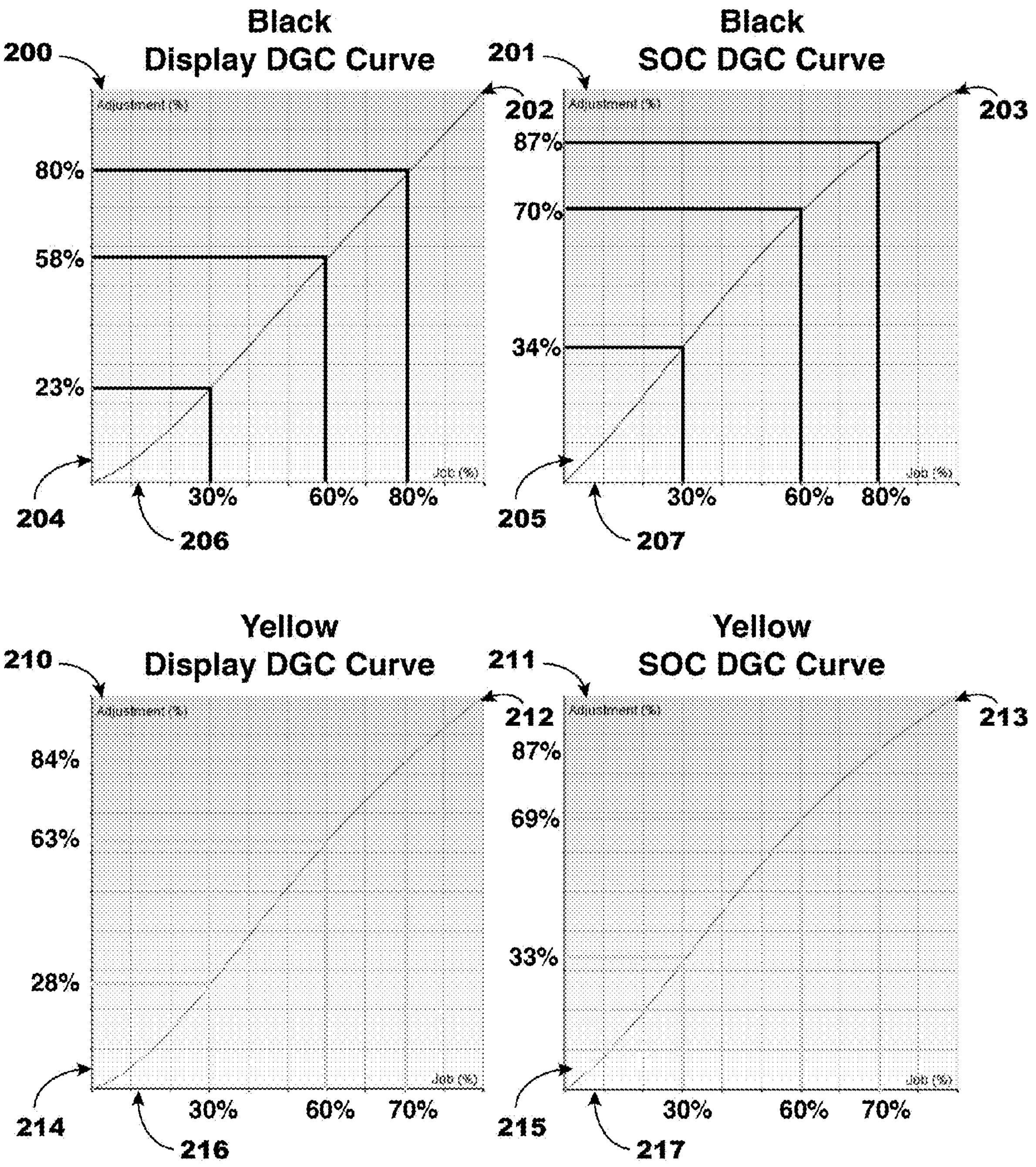
FIG. 2A shows front views of representative examples of separate black and yellow DGC curves for both the display and SOC areas.
Figure 2B:
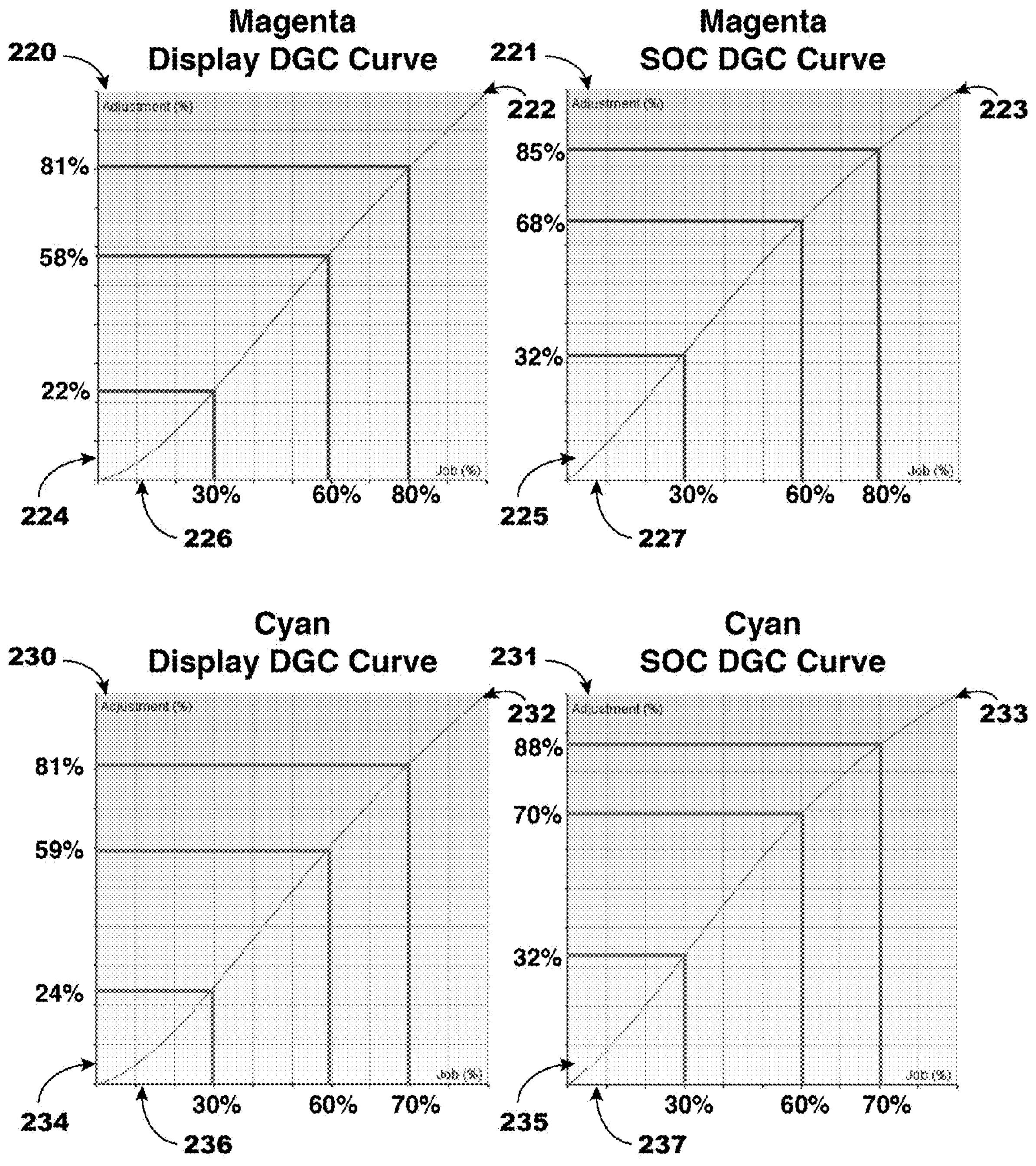
FIG. 2B shows front views of representative examples of separate magenta and cyan DGC curves for both the display and SOC areas.

FIGS. 2A and 2B, taken together, illustrate example embodiments of cyan, magenta, yellow, and black DGC curve sets for the portions of the overprint for the display area and SOC area of an example instant lottery ticket. FIG. 2A illustrates the DGC black curves 200 and 201 and the DGC yellow curves 210 and 211, and FIG. 2B illustrates the DGC magenta curves 220 and 221 and DGC cyan curves 230 and 231 for both the display and SOC areas of the example instant lottery ticket.

The FIG. 2A DGC display area black curve 202 and the DGC SOC area black curve 203 are shown side-by-side for illustrative purposes. Each black curve 202, and 203 is plotted on a separate X/Y grid with the X-axis (abscissas) 206 and 207 respectively, representing the expected grayscale values, and the Y-axis (ordinates) 204 and 205 respectively, representing the grayscale value dot gain on the associated printing plate or on-press imager. Both the display area and SOC area black curves 202 and 203 are non-linear and differ in shape and values. These differences in shape and value are attributable to the differences between the surface chemistries and structures of the respective display area and the SOC area of the instant lottery ticket. The surface chemistries and structures of the respective display area and the SOC area of an instant lottery ticket may be referred to herein as the compositions of the respective display area and the SOC area. respective display area and the SOC area. Aside from the curves, the differences between the black display curve 202 and the SOC curve 203 are also non-linear. For example, (1) a 30% grayscale value on the black display curve's 202 abscissa 206 translates to a grayscale value of 23% on its ordinate 204 (and thus a dot gain of minus 7%), while (2) a 30% grayscale value on the black SOC curve's 203 abscissa 207 translates to a grayscale value of 34% on its ordinate 205 (and thus a dot gain of plus 4%). These differences between the display area and SOC area curves 202 and 203 are not constant. For example, (1) an 80% grayscale value on the black display curve's 202 abscissa 206 translates to a grayscale value of 80% on its ordinate 204 (and thus a dot gain of 0%), while (2) an 80% grayscale value on the black SOC curve's 203 abscissa 207 translates to a grayscale value of 87% on its ordinate 205 (and thus a dot gain of plus 7%).

The FIG. 2A display area and the SOC area yellow DGC curves 212 and 213, respectively, are also shown side-by-side with each yellow curve 212 and 213 respectively plotted on separate X/Y grids with the abscissa 216 and 217 respectively representing the expected grayscale values and the ordinate 214 and 215 respectively representing the grayscale value dot gain on the associated printing plate or on-press imager. As before, both the display area and the SOC area yellow curves 212 and 213 are non-linear and differ in shape and values, which is attributable to the differences between the surface chemistries and structure of the display area and the SOC area of the instant lottery ticket. For example, (1) a 30% grayscale value on the yellow display curve's 216 abscissa 206 translates to a grayscale value of 28% on its ordinate 214 (and thus a dot gain of minus 2%), while (2) a 30% grayscale value on the yellow SOC curve's 213 abscissa 217 translates to a grayscale value of 33% on its ordinate 215 (and thus a dot gain of plus 3%), with (3) a 70% grayscale value on the yellow display curve's 212 abscissa 216 translating to a grayscale value of 84% on its ordinate 214 (and thus a dot gain of plus 14%), while (4) a 70% grayscale value on the yellow SOC curve's 213 abscissa 217 translates to a grayscale value of 87% on its ordinate 215 (and thus a dot gain of plus 17%). Thus, the black and yellow DGC curves differ not only between the display area and the SOC area of the instant lottery ticket but also by color.

The FIG. 2B display area and the SOC area magenta DGC curves 222 and 223 are also shown side-by-side with each magenta curve 222 and 223 respectively plotted on separate X/Y grids with the abscissa 226 and 227 respectively representing the expected grayscale values and the ordinate 224 and 225 respectively representing the grayscale value dot gain on the associated printing plate or on-press imager. As before, both the display area and the SOC area magenta curves 222 and 223 are non-linear and differ in shape and values in a non-linear fashion that is attributable to the differences between the surface chemistries and structure of the display area and the SOC of the instant lottery ticket. For example, (1) a 30% grayscale value on the magenta display curve's 222 abscissa 226 translates to a grayscale value of 22% on its ordinate 224 (and thus a dot gain of minus 8%), while (2) a 30% grayscale value on the magenta SOC curve's 223 abscissa 227 translates to a grayscale value of 32% on its ordinate 225 (and thus a dot gain of plus 2%), with (3) an 80% grayscale value on the magenta display curve's 222 abscissa 226 translating to a grayscale value of 81% on its ordinate 224 (and thus a dot gain of plus 1%), while (4) an 80% grayscale value on the magenta SOC curve's 223 abscissa 227 translates to a grayscale value of 85% on its ordinate 225 (and thus a dot gain of plus 5%).

Finally, the FIG. 2B display area and the SOC area cyan DGC curves 232 and 233 respectively are also shown side-by-side with each cyan curve 232 and 233 respectively plotted on separate X/Y grids with the abscissa 236 and 237 respectively representing the expected grayscale values and the ordinate 234 and 235 respectively representing the grayscale value dot gain on the associated printing plate or on-press imager. Again, both the display area and the SOC area cyan curves 232 and 233 are non-linear and differ in shape and values in a non-linear fashion that is attributable to the differences between the surface chemistries and structures of the display area and SOC area of the instant lottery ticket. For example, (1) a 30% grayscale value on the cyan display curve's 232 abscissa 236 translates to a grayscale value of 24% on its ordinate 234 (and thus a dot gain of minus 6%), while (2) a 30% grayscale value on the cyan SOC curve's 233 abscissa 237 translates to a grayscale value of 32% on its ordinate 235 (and thus a dot gain of plus 2%), with (3) a 70% grayscale value on the cyan display curve's 232 abscissa 236 translating to a grayscale value of 81% on its ordinate 234 (and this a dot gain of plus 11%), while (4) a 70% grayscale value on the cyan SOC curve's 233 abscissa 237 translates to a grayscale value of 88% on its ordinate 235 (and thus a dot gain of plus 18%). Again, the various DGC curves differ not only between the display and SOC areas of the instant lottery ticket but also by color.

Figure 2C:
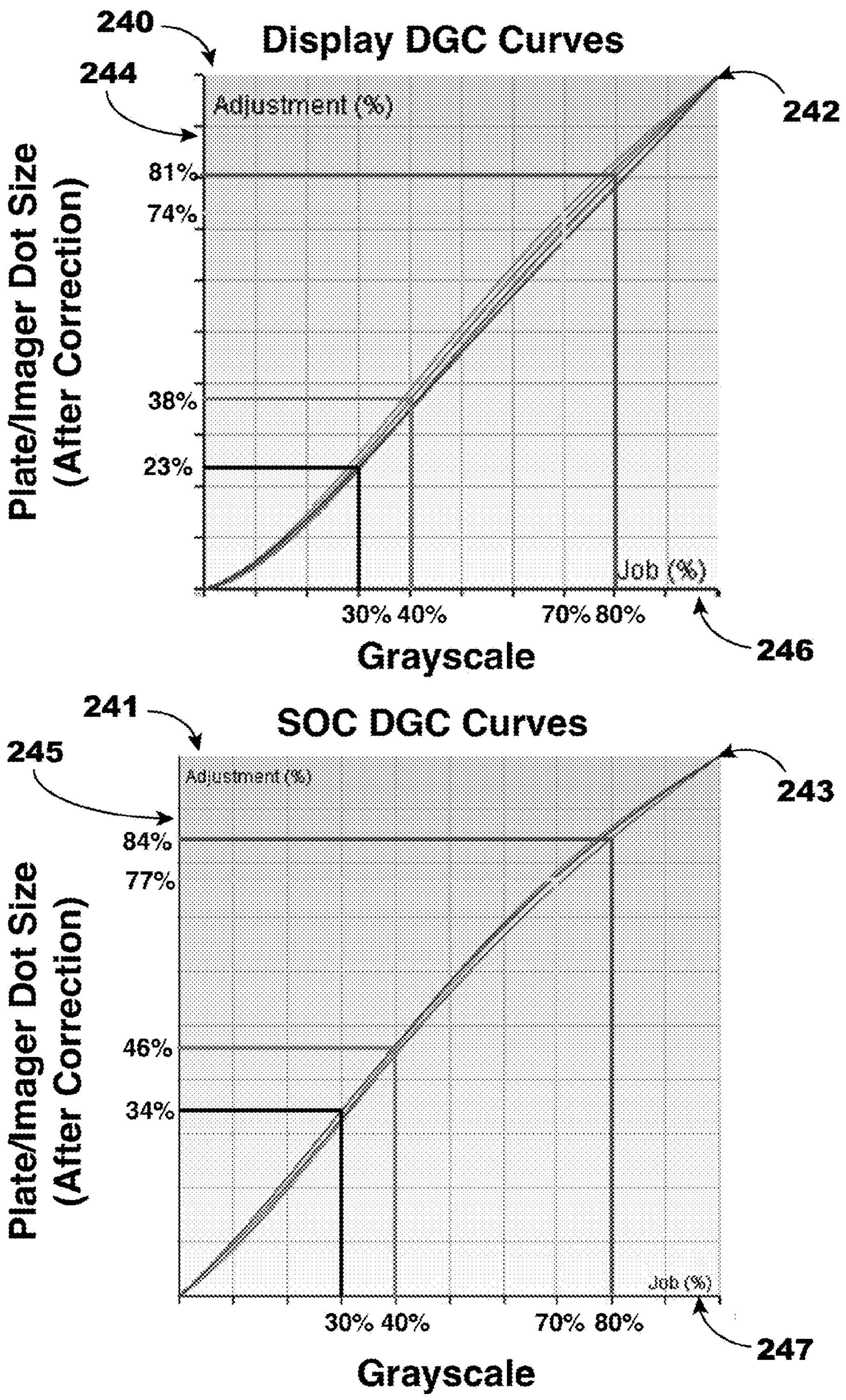
FIG. 2C shows front views of representative examples of combined CMYK DGC curves for both the display and SOC areas.

FIG. 2C illustrates the combined CMYK DGC curves 242 and 243 (respectively) plotted on the same grid for both the display area 240 and the SOC area 241 of an example instant lottery ticket. As before, the two combined CMYK DGC curves are plotted on separate X/Y grids with the abscissa 246 and 247 respectively representing the expected grayscale values and the ordinate 244 and 245 respectively representing the grayscale value dot gain on the associated printing plate or on-press imager. When comparing the combined CMYK display area curve 242 and the SOC area curve 243, it becomes apparent that the distribution of the display area curve 242 and the SOC area curve 243 colors vary between the display area 240 and the SOC area 241 grids with a more dispersed DGC curve distribution of the display area than the SOC area of an instant lottery ticket. These DGC curve distributions are typical of most instant lottery tickets.

Figure 2D:
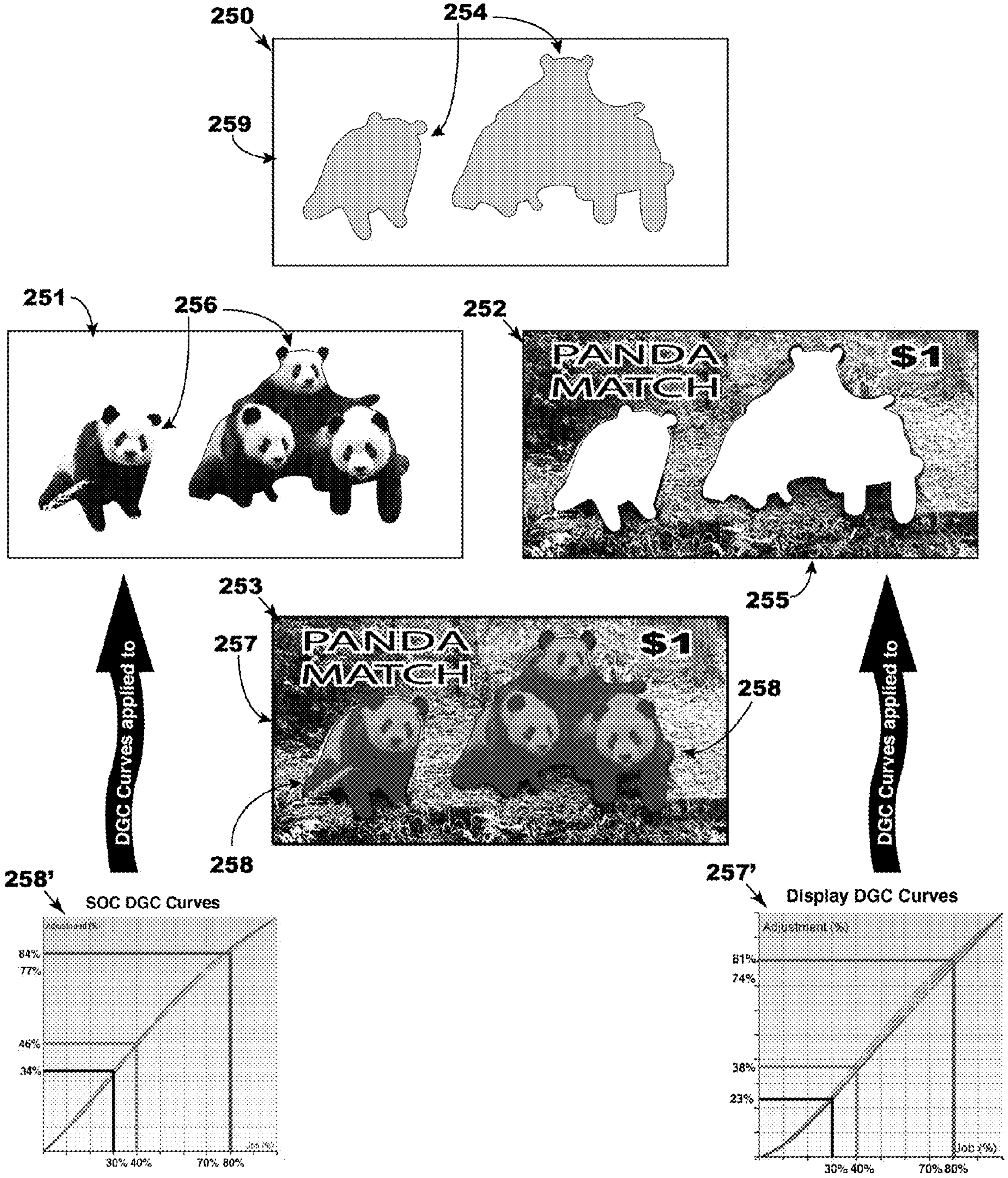
FIG. 2D is a front view of a representative example of a combined known overprint comprised of discrete artwork with separate DGC curves applied to the display and SOC portions.
Figure 2E:
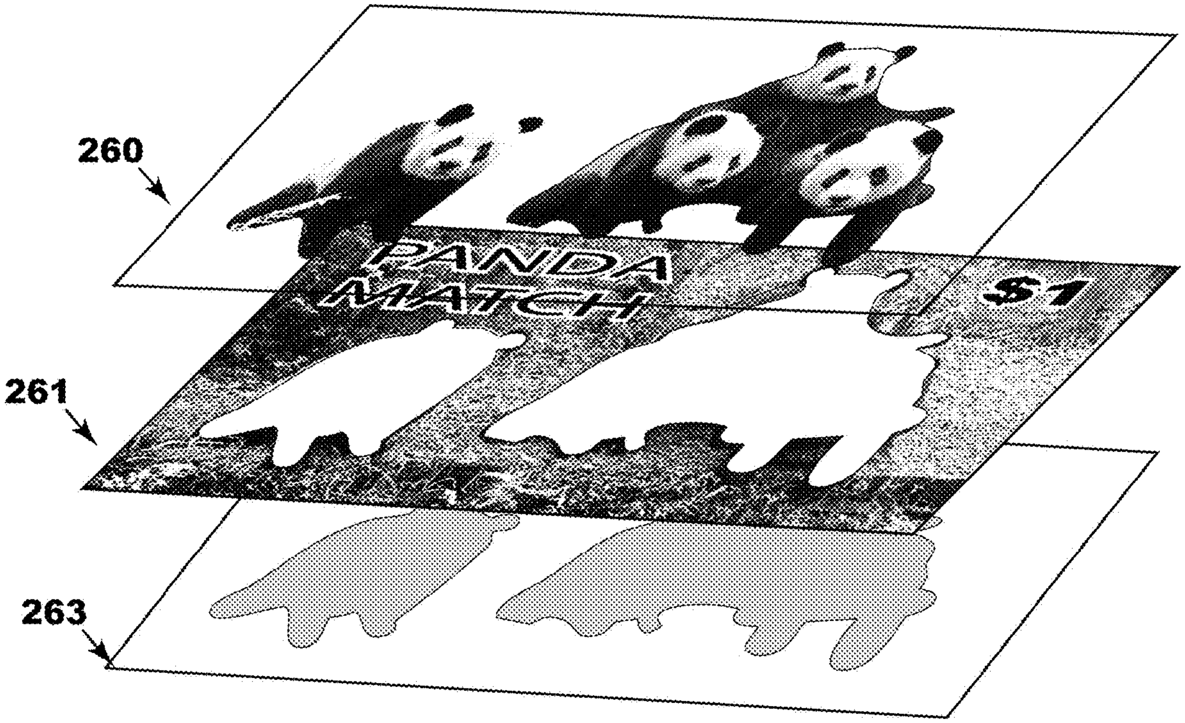
FIG. 2E is a front isometric view of the representative example combined known overprint of FIG. 2D illustrating the discrete artwork as separate layers.

FIGS. 2D and 2E, taken together, illustrate an example embodiment of the configuration of an instant lottery ticket and how the artwork for the display area and SOC area of the instant lottery ticket can be separated with their associated DGC curve sets applied and then combined into one consistent homogeneous printed application in accordance with the present disclosure. FIG. 2D shows front elevation views of the example instant lottery ticket highlighting the display area and the SOC area, and FIG. 2E illustrates the same example instant lottery ticket in a front isometric view.

The front substrate 259 in FIG. 2D and 263 in FIG. 2E, and lower security ink layers 254 in FIG. 2D of the example instant lottery ticket are shown in image 250. Image 251 illustrates only the SOC area 256 with its associated decorative overprint (also shown in FIG. 2E as layer 260). Image 252 shows only the display area 255 with its overprint (also shown in FIG. 2E as layer 261). Image 253 shows the combined display area 257 and the SOC area 258 (shown highlighted) integrated into one consistent printed application with each portion's dot gain adjusted by separate CMYK DGC curve sets (e.g., 257' for the display area 257 and 258' for the SOC area 258, and corresponding to the display area curve 257' and SOC area curve 258' are shown full size in FIG. 2C).

Figure 3A:
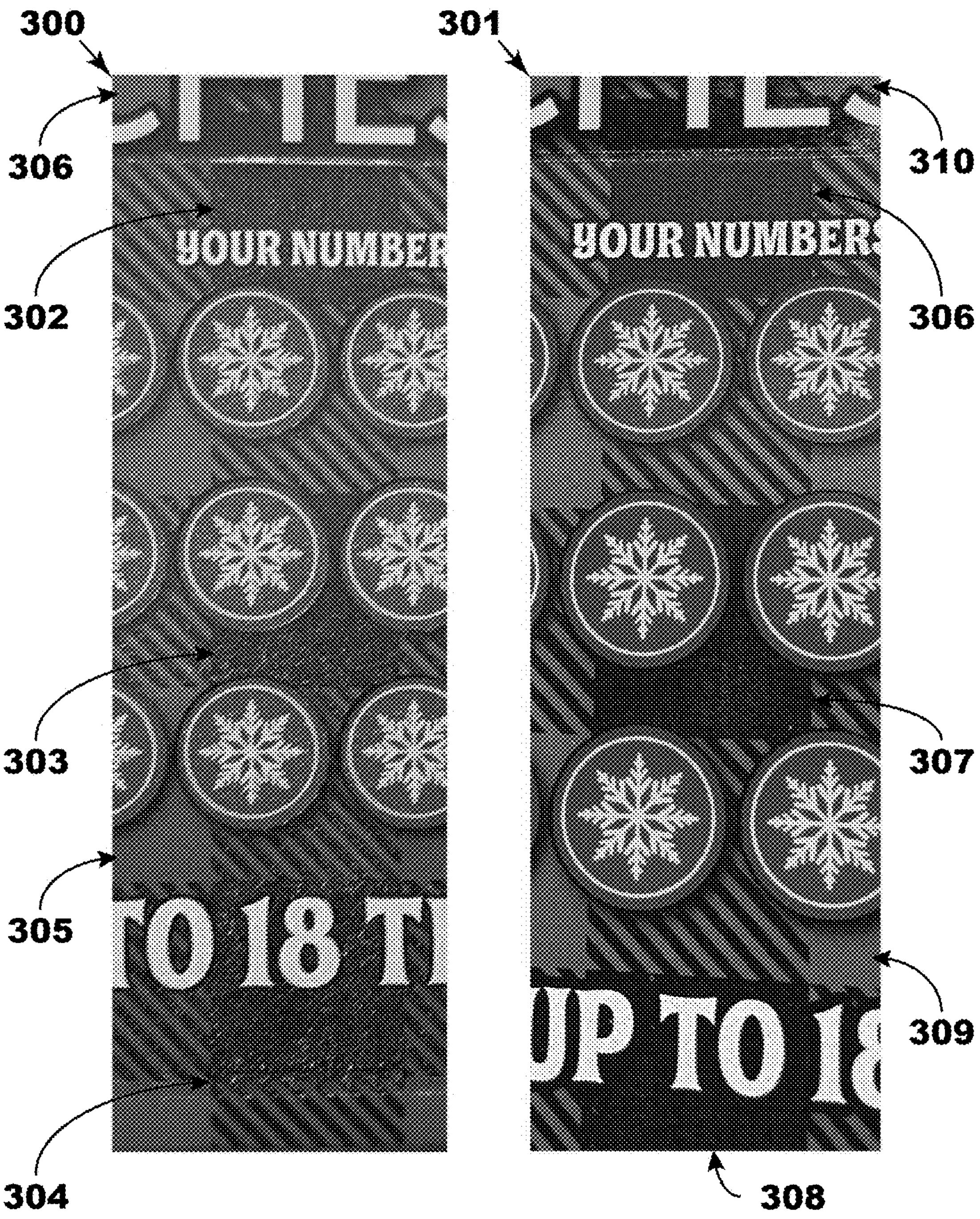
FIG. 3A shows two magnified front views of representative examples of instant lottery ticket SOC areas with and without the advantages taught by the present disclosure.
Figure 3B:
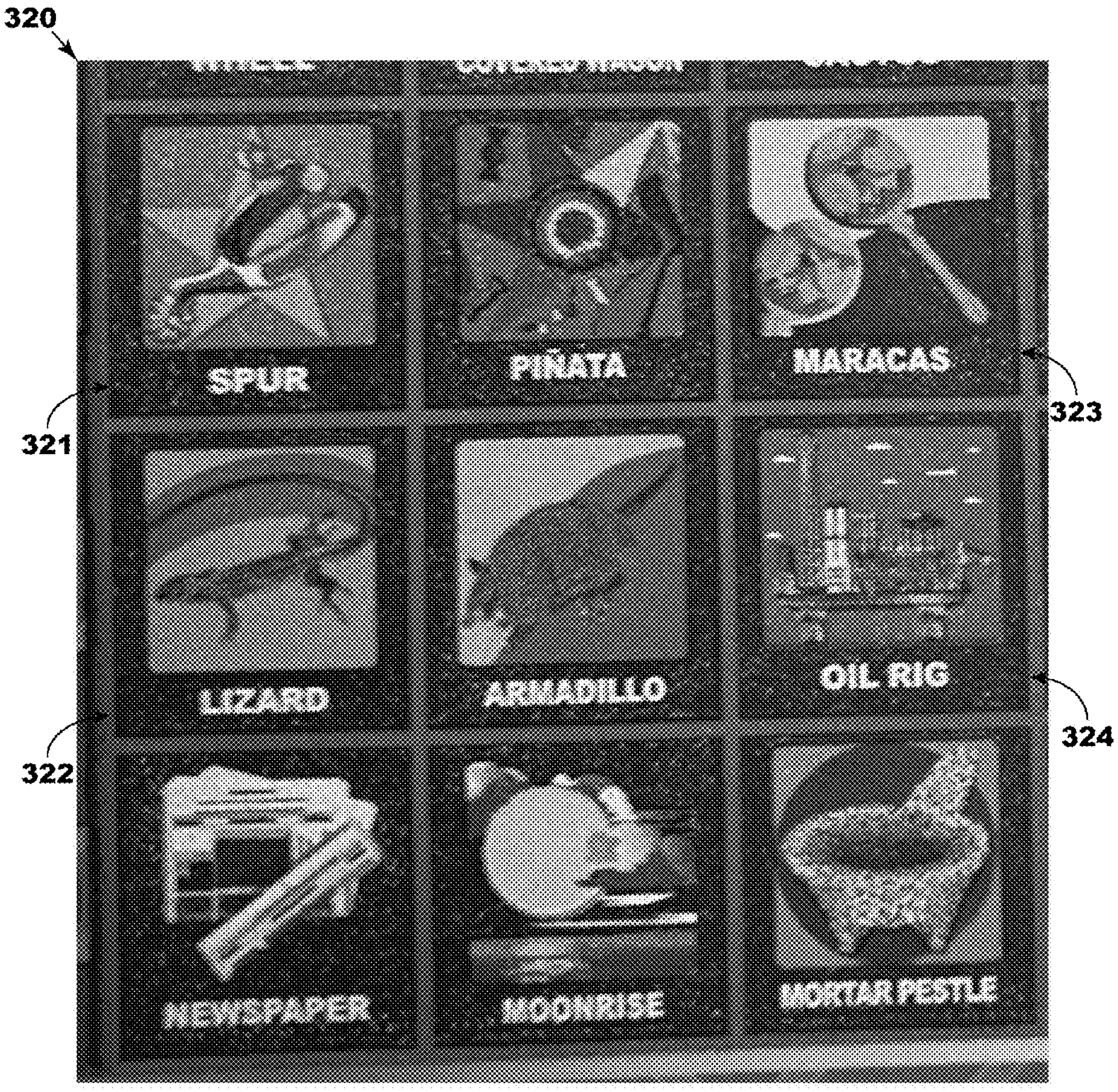
FIG. 3B PRIOR ART
FIG. 3B is a magnified front view of a known representative example of an instant lottery ticket SOC area.
Figure 3C:
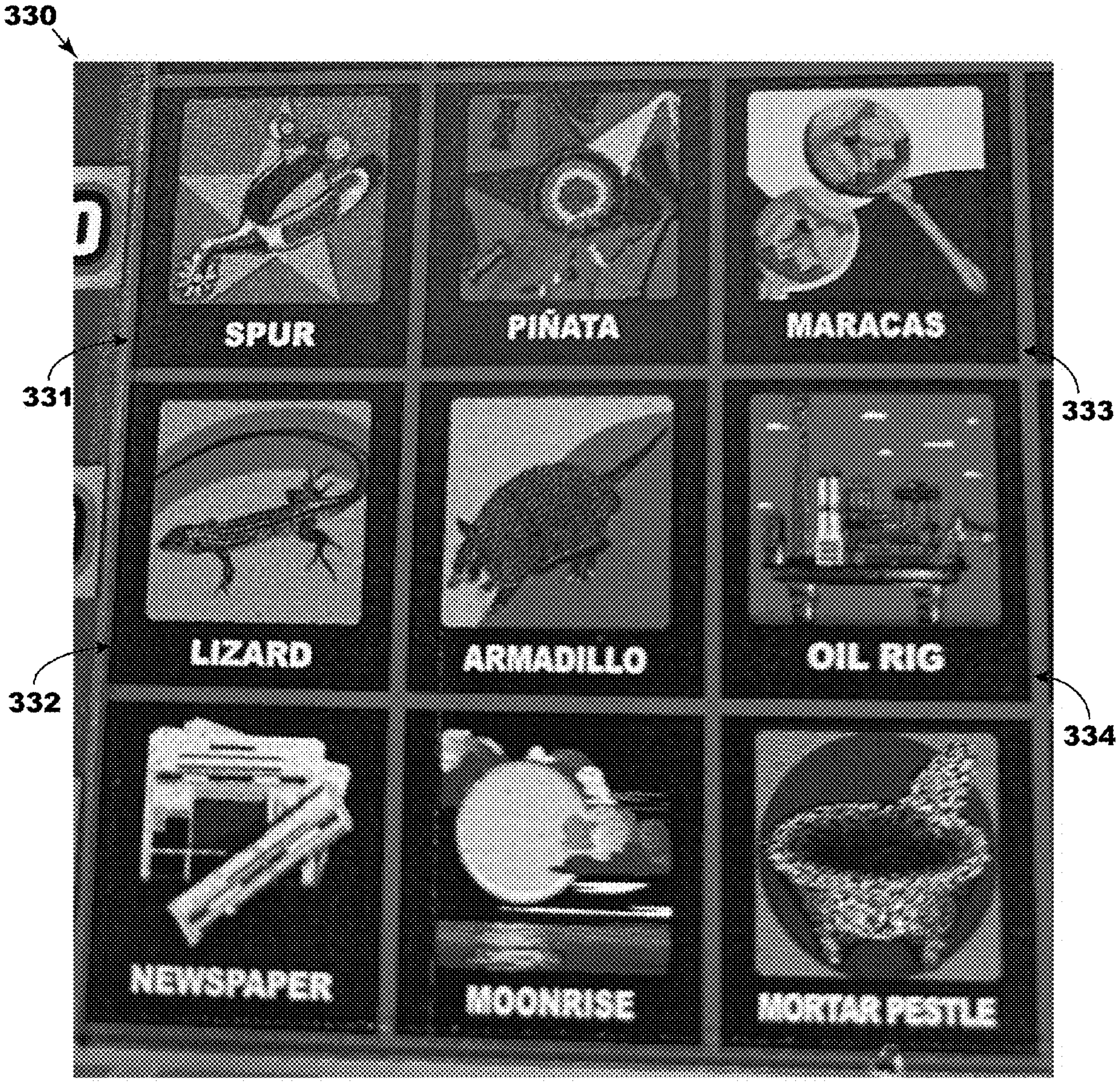
FIG. 3C is a magnified front view of a representative example of the instant lottery ticket SOC area of FIG. 2B with the advantages taught by the present disclosure.

FIGS. 3A, 3B, and 3C, taken together, illustrate a comparison of the document printing improvements provided by an example embodiment of the present disclosure relative to a known document printing method. FIG. 3A shows magnified front elevation views of a portion 300 of an example instant lottery ticket SOC and display areas as they would appear using a known printing technique as compared to a portion 301 of an example instant lottery ticket SOC and display areas as they would appear using the Object Based Screening (OBS) application 301 provided by various embodiments of the prevent disclosure. FIG. 3B shows a magnified view of a SOC area 320 of an example instant lottery ticket that can be compared to the similar magnified view of a SOC area 330 of an example instant lottery ticket shown in FIG. 3C that is printed in accordance with an example embodiment of the present disclosure.

More specifically, FIG. 3A illustrates; (1) a magnified view of the display area and the SOC area of part 300 of an example first instant lottery ticket showing a SOC area decorative overprint printed and a portion of the display area printed with a known printing technique; and (2) a contrasting magnified view of the display area and the SOC area of part 301 of a similar instant lottery ticket printed in accordance with an example embodiment of the present disclosure. As shown in magnified view of part 300, the process red color printed over the SOC area 305 appears to be darker and less vibrant than the process red color printed in the display portion 306. Also, as shown in the magnified view of part 300, the black areas 302, 303, and 304 of the SOC area include significant "pin-holing" as well as an irregular surface appearance. In comparison, as shown in the magnified view of part 301 (which is printed in accordance with an example embodiment of the present disclosure), the process red color 309 printed over the SOC area is virtually identical to the process red color printed in the display area 310. Also, in part 301, the similar black areas 306, 307, 308, and 309 over the SOC area include virtually no pin-holing as well as a smooth surface appearance.

The magnified view in FIG. 3B of the SOC area of a second exemplary ticket 320 printed with a known printing technique also shows significant pin-holing as well as an irregular surface appearance in its black areas 321, 322, 323, and 324. In comparison, in FIG. 3C, the magnified view of ticket 330 (which is printed in accordance with the example embodiment of the present disclosure) includes similar black areas 331, 332, 333, and 334 over the SOC area with virtually no pin-holing as well as a smooth surface appearance.

It should be appreciated that using DGC curves to adjust the printed dot size is only one (AM) embodiment that achieves enhanced homogeneity across both the display and SOC areas when using a common printing process. In FM or stochastic imaging embodiments (e.g., digital imagers), it may be more desirable to apply the principle of DGC curves to vary the population of individual dots over given areas, thereby achieving varying amounts of ink deposited on the display and SOC areas while maintaining the same size for all printed dots.

Figure 4A:
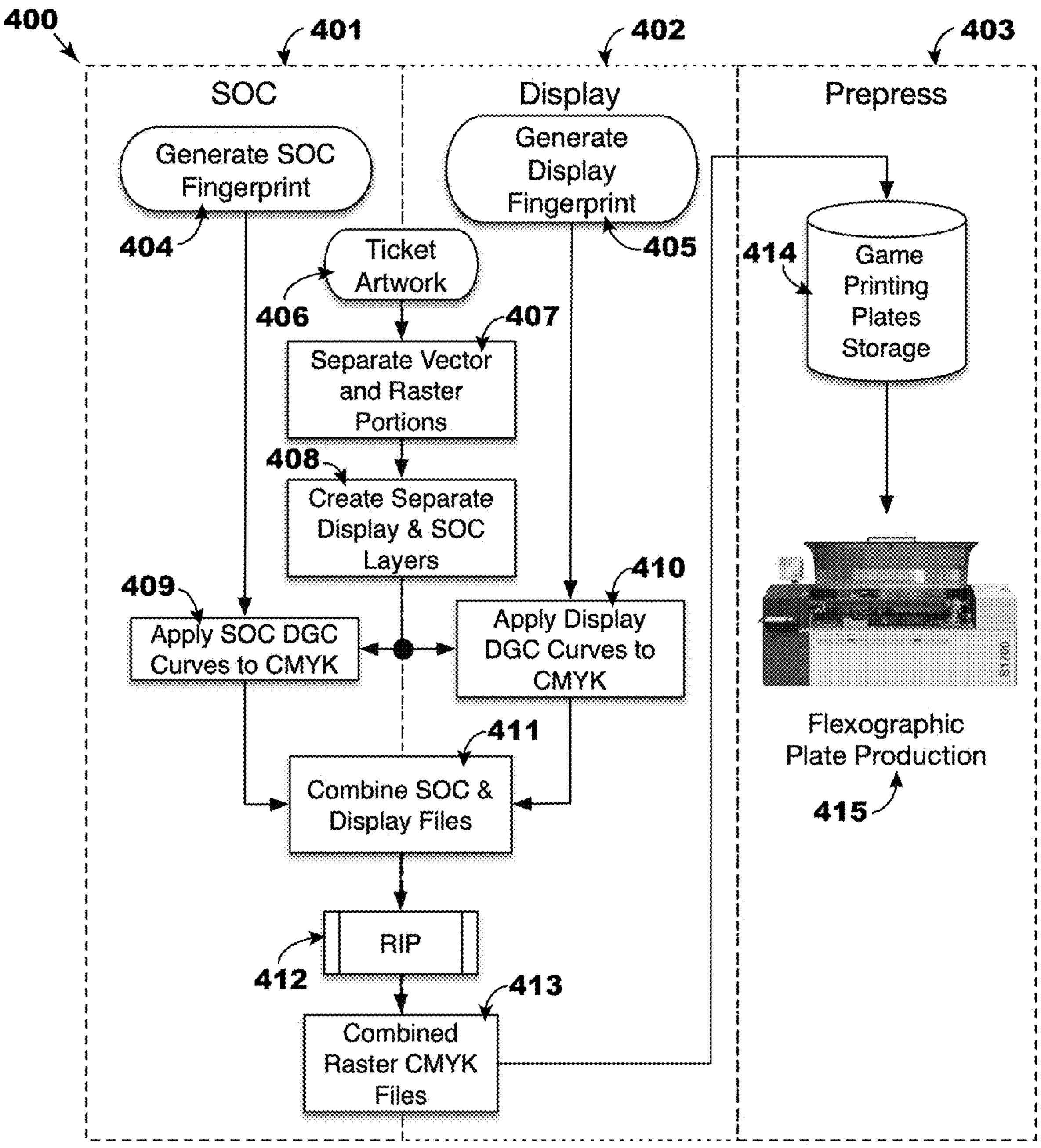
FIG. 4A is an overall block diagram representative example providing a schematic graphical overview of an exemplary embodiment of a system for printing consistently appearing colorful images (that can be patterns) over both the SOC and display areas compatible with FIGS. 3A and 3C with static printing plates in accordance with the present disclosure.
Figure 4B:
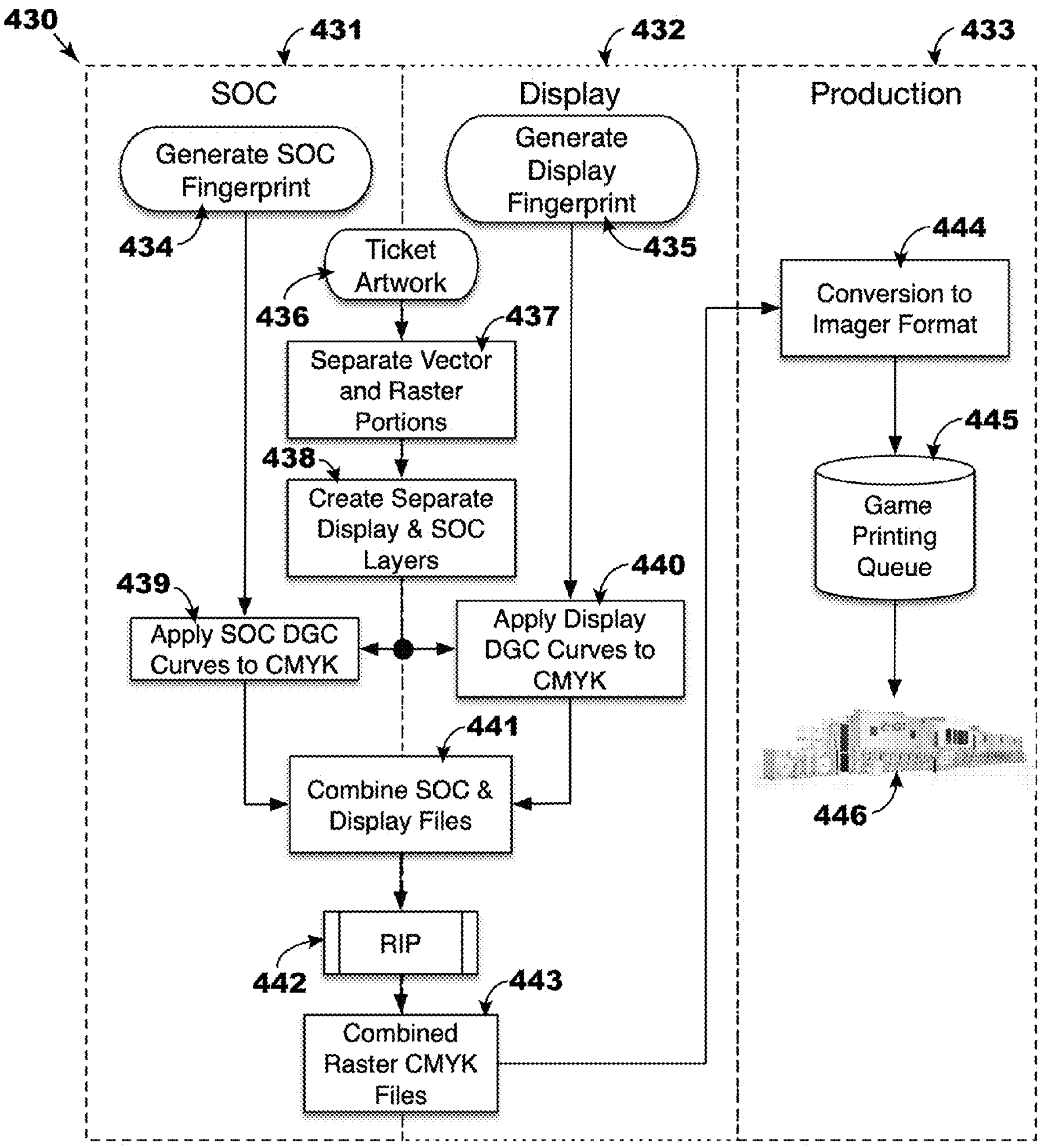
FIG. 4B is an overall block diagram representative example providing a schematic graphical overview of an exemplary embodiment of a system for printing consistently appearing colorful images (that can be patterns) over both the SOC and display areas compatible with FIGS. 3A and 3C with a digital imager in accordance with the present disclosure.

FIGS. 4A and 4B, taken together, provide example embodiments of the OBS printing systems and methods provided by the present disclosure. FIG. 4A is a schematic graphical overview of an exemplary embodiment of a system and method for printing a consistently appearing colorful overprint (including images such as but not limited to patterns) over both the SOC area and the display area compatible with FIGS. 3A and 3C using static printing plates. FIG. 4B is a schematic graphical overview of an exemplary embodiment of a system and method for printing a consistently appearing colorful overprint (including images such as but not limited to patterns) over both the SOC area and the display areas compatible with FIGS. 3A and 3C using a digital imager.

The block diagrams of FIGS. 4A and 4B are both functionally subdivided into three columns depicting the functionality unique to the SOC portions 401 and 431 of FIGS. 4A and 4B, respectively, the display portion 402 and 432 of FIGS. 4A and 4B, respectively, and the prepress or production portion 403 and 433 of FIGS. 4A and 4B, respectively. If a particular block diagram function appears completely within a column, its functionality is limited to the data category of the associated column. For example, the Generate SOC Fingerprint 404 is exclusive to the SOC column 401. If a particular block diagram function appears in two columns, its functionality is shared by the data categories of both columns. For example, Ticket Artwork 406 is shared between the SOC column 401 and the display column 402.

FIG. 4A shows that the method begins with Ticket Artwork 406 being provided for an instant lottery ticket game to enable the production of the instant lottery tickets for that game to be produced. However, prior to starting production on a new instant lottery ticket game, both the SOC area and the display area of a generic instant lottery ticket are first "fingerprinted" as indicated by blocks 404 and 405, respectively, and the resulting DGC curve sets are saved in a digital memory device.

By first printing separate fingerprint samples of the display area and SOC area from a generic instant lottery ticket, each fingerprint sample can be scanned and digitally analyzed to create respective individual unique DGC curves for the display area and the SOC area. As explained above, fingerprinting is a process to determine how a press physically prints, thereby quantifying its printed dot gain values. Press fingerprinting is inherently dependent on press operating parameters and consequently should be repeated if there is a change to these parameters, including substrate type, ink, plate, run speed, and/or screening (i.e., dot shapes, ruling, screen angles). In general, in accordance with the present disclosure, there should be a set of DGC curves for each set of operating parameters commonly employed with a given press. Once the display area and SOC area fingerprint sets have been printed and scanned, the resulting digital files are analyzed to create sets of DGC curves for the display area and SOC area of the instant lottery tickets. These resulting DGC curve sets are then utilized by SOC and display processes 409 and 410, respectively, to standardize or normalize the final printed output.

Returning to Ticket Artwork 406, after it is received for an instant lottery ticket game, the Ticket Artwork 406 comprises both vector and raster imaged portions. In various embodiments, the vector and raster portions are first divided by the Separate Vector and Raster Portions 407 function and stored in separate files or layers to simplify further processing. Next, the display and SOC portions of the vector and raster artwork are also separated into different files or layers 408.

Once the vector and raster portions are separated 407 and placed in their respective Display and SOC layers 408, the appropriate sets of DGC curves are applied to the display portion 410 and the SOC portion 409, thereby creating different dot compensations for the display area and the SOC area of the instant lottery ticket. Once each set of DGC curves has been applied to its associated portion, the two separate portions are merged into a common digital file 411 comprising the entire front of the instant lottery ticket. This merged file 411 is then further processed by a RIP 412, with the resulting RIP output saved as multiple raster files 413 for each color (e.g., CMYK artwork would produce four files). These digital raster files are then saved in a database storage device 414 until the are used to form a printing plate 415 that can be used to print the instant lottery tickets of the new lottery game.

It should be appreciated that are other methodologies for initiating printing, consistently appearing colorful images (such as but not limited to patterns) over both the display area and SOC area of an instant lottery ticket that may, under some circumstances, be more desirable. For example, different line screens or rulings can be applied to the separate display and SOC areas to alter the volume of ink applied to each area, or the dot shape itself may be altered from the display to the SOC areas, or some combination of options can be applied separately to the display and SOC areas.

The block diagram 430 of FIG. 4B is almost identical to block diagram 400 of FIG. 4A, with the exception of the final output of system and method shown by the block diagram 430 of FIG. 4B will be data files representing the ink dispersed from an inkjet imager. While some inkjet imagers only print dots of a fixed size, the very small sizes of these dots (e.g., 1,600 Dots Per Inch or "DPI") allow these smaller dots to be printed in a FM or stochastic imaging manner that an appropriate set of DGC curves can then modify.

The system and method of FIG. 4B begins with Ticket Artwork 436 being provided for an instant lottery ticket game to be produced. As in the above described example embodiment, prior to starting production on a new instant lottery ticket game, both the SOC and Display areas of a generic imaged instant ticket 434 and 435, respectively must first be fingerprinted with and the resulting DGC curve sets are saved in digital memory.

The Ticket Artwork 436 includes both vector and raster imaged portions. Optionally, to simplify further processing, the vector and raster portions are first divided by the Separate Vector and Raster Portions 437 functions and then stored in separate files or layers. Next, the display and SOC portions of the vector and raster artwork are also separated into different files or layers 438.

Once the vector and raster portions are separated 437 and placed in their respective Display and SOC layers 438, the appropriate sets of DGC curves are applied to the display portion 440 and SOC portion 439, thereby creating different dot compensations for the display area and the SOC area of the instant lottery ticket. After each set of DGC curves has been applied to associated portions, the separate portions are merged into a common digital file comprising the entire front of the instant lottery ticket 441. This merged file 441 is then further processed by a RIP 442, with the resulting RIP output saved as multiple raster files 443 for each color (e.g., CMYK artwork would produce four files). These digital raster files are then converted into a format that can be processed by the imager 444 (e.g., Portable Data Format or "PDF"), embedded in every ticket in the game to be printed, and then saved in a secure optionally encrypted database 445 until the imager needs it to print the instant lottery tickets 446.

It should be appreciated by those skilled in the art in view of this description that various modifications and variations can be made to the present disclosure without departing from the scope and spirit of the present disclosure. It is intended that the present disclosure include such modifications and variations as come within the scope of the appended claims.

We claim:

1. A method for printing an instant lottery ticket having a substrate, said method comprising:

determining a first portion of artwork to print on a display area of the substrate, wherein the first portion comprises a first volume of ink;

determining a second portion of the artwork to print on a Scratch-Off Coating (SOC) area of the substrate, wherein the SOC area has a different composition than the display area, wherein the second portion comprises a different second volume of ink, wherein the different first and second volumes of ink are determined by creating and assigning different Dot Gain Compensation (DGC) curves for the display area and the SOC area;

printing the first portion of artwork on the display area of the substrate; and printing the second portion of the artwork on the SOC on the SOC area of the substrate.

2. The method of claim 1, wherein the first portion comprises a first plurality of dots of ink each of a first size, wherein the second portion comprises a second plurality of dots of ink each of a second size, and wherein the first size is different than the second size.

3. The method of claim 1, wherein the first portion comprises a first plurality of dots of ink each of a first size, wherein the second portion comprises a second plurality of dots of ink each of a second size, and wherein the first size is less than the second size.

4. The method of claim 1, wherein the first portion and the second portion each comprise a plurality of dots of ink each of the same size, wherein a first quantity of dots are printed in a first area of the first portion, wherein a second quantity of dots are printed in the same size second area of the second portion with a same grayscale value as the first area, and wherein the second quantity is greater than the first quantity.

5. The method of claim 1, wherein the first portion comprises a first quantity of dots of ink in a first area of a first size and first grayscale value, wherein the second portion comprises a second quantity of dots of ink in a second area of the first size and with the first grayscale value, and wherein the first quantity is less than the second quantity.

6. The method of claim 1, wherein the first portion and the second portion are each Cyan, Magenta, Yellow, and black (CMYK) process colors.

7. The method of claim 1, wherein the first portion and the second portion each comprise a spot color.

8. The method of claim 1, wherein a first section of the first portion and a first section of the second portion are monochromatic.

9. The method of claim 1, wherein the Dot Gain Compensation (DGC) curves each are nonlinear.

10. The method of claim 1, wherein the Dot Gain Compensation (DGC) curve for the display area and the Dot Gain Compensation (DGC) curve for the SOC area have separate and different line screens.

11. A method for generating an overprint raster file based on an artwork file, the method comprising:

determining a display Dot Gain Compensation (DGC) curve set for a first portion display area of a substrate fingerprint;

determining a SOC DGC curve set for a second portion Scratch-Off Coating (SOC) area fingerprint;

applying the display DGC curve set to a first portion display area file, thereby modifying dot size in the display area file to create a modified display area file;

applying the SOC DGC curve set to a second portion SOC area file, thereby modifying dot size in the SOC area file to create a modified SOC area file;

merging the modified display area file and the modified SOC area file into a single combined file;

causing a Raster Image Processor (RIP) to convert the single combined file into the overprint raster file that is usable to ensure a consistent appearing overprint on both the display area and the SOC area of an instant lottery ticket, wherein the display area and the SOC area have different compositions, and wherein the overprint is based on artwork of the artwork file; and storing the raster file for on-press production.

12. The method of claim 11, wherein the display DGC curve set and the SOC DGC curve set each comprise Cyan, Magenta, Yellow, and black (CMYK) process colors.

13. The method of claim 11, wherein the overprint raster file is configured to enable the generation of a printing plate.

14. The method of claim 11, wherein the artwork file includes vector portions.

15. The method of claim 11, wherein the artwork file includes raster portions.

16. A method for printing consistently appearing images of artwork over both a display area and a Scratch-Off Coating (SOC) of an SOC area of an instant lottery ticket using an on-press imager, the method comprising:

using fingerprinting to determine a display area Dot Gain Compensation (DGC) curve set;

using fingerprinting to determine a SOC DGC curve set;

separating a vector portion and a raster portion of the artwork;

storing the vector portion in a vector portion file;

storing the raster portion in raster portion file;

separating a display area portion and a SOC area portion of the vector portion in the vector portion file;

storing the display area portion in a display area vector portion file;

storing the SOC area portion in a SOC area vector portion file;

separating a display area portion and a SOC area portion of the rater portion in the raster portion file;

storing the display area portion in a display area raster portion file;

storing the SOC area portion in a SOC area raster portion file;

applying the display area DGC curve set to the display area raster portion file to create a modified display area raster portion file;

applying the SOC DGC curve set to the SOC area raster portion file to create a modified SOC raster portion file;

merging the modified display area raster portion file and the modified SOC area raster portion file into a modified raster portion file;

converting the modified raster portion file into raster files with a Raster Image Processor (RIP);

converting the raster files into formatted raster files configured to be processed by the on-press imager;

embedding the formatted raster files; and storing the formatted raster files for on-press imager production to ensure consistent printing of the images of the artwork over both the display area and the Scratch-Off Coating (SOC) of the SOC area of the instant lottery ticket.

17. The method of claim 16, wherein the display area DGC curve set and the SOC area curve set each comprise Cyan, Magenta, Yellow, and black (CMYK) process colors.

18. The method of claim 16, wherein the display area DGC curve set and the SOC area curve set each have separate and different line screens.

19. The method of claim 16, which comprises converting the formatted raster files to a Portable Data Format (PDF) standard.

20. The method of claim 16, which comprises storing the formatted raster files in an encrypted format.

* * * * *